(12) United States Patent
Dai

(10) Patent No.: US 8,805,065 B2
(45) Date of Patent: Aug. 12, 2014

(54) IMAGE PROCESSING APPARATUS AND IMAGE PROCESSING METHOD

(71) Applicant: Canon Kabushiki Kaisha, Tokyo (JP)

(72) Inventor: Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 13/726,977

(22) Filed: Dec. 26, 2012

(65) Prior Publication Data

US 2013/0170742 A1 Jul. 4, 2013

(30) Foreign Application Priority Data

Dec. 28, 2011 (JP) ................................. 2011-289895

(51) Int. Cl.
*G06K 9/00* (2006.01)
*G06T 7/00* (2006.01)

(52) U.S. Cl.
CPC ..... *G06T 7/0079* (2013.01); *G06T 2207/20144* (2013.01); *G06T 7/0081* (2013.01); *G06T 7/0097* (2013.01); *G06T 2207/10028* (2013.01); *G06T 2207/10024* (2013.01)
USPC ........................................................ 382/164

(58) Field of Classification Search
USPC .................................. 382/162, 164, 171, 173
See application file for complete search history.

(56) References Cited

FOREIGN PATENT DOCUMENTS

| JP | 2008-547097 A | 12/2008 |
|---|---|---|
| JP | 2009-282979 A | 12/2009 |
| WO | 2006/138730 A | 12/2006 |

OTHER PUBLICATIONS

Rother et al., "Grabcut: Interactive Foreground Extraction Using Iterated Graph Cuts", ACM Trans. Graph., vol. 23, No. 3, 2004, pp. 309-314.
C. Dal Mutto et al., "Scene Segmentation by Color and Depth Information and its Applications", STDay 2010, 2010.
H. He et al., "Graphcut-based Interactive Segmentation Using Colour and Depth Cues", Australasian Conference on Robotics and Automation (ACRA 2010), 2010.
F. Calderero and F. Marques, "Hierarchical Fusion of Color and Depth Information at Partition Level by Cooperative Region Merging", IEEE International Conference on Acoustics, Speech and Signal Processing (ICASSP 2009).

*Primary Examiner* — Duy M Dang
(74) *Attorney, Agent, or Firm* — Carter, DeLuca, Farrell & Schmidt, LLP

(57) ABSTRACT

A technique capable of more suitably extracting a foreground region from an image including the foreground region and a background region is provided. The image processing apparatus comprises: a reliability derivation unit configured to derive a reliability of a distance information of a pixel of interest based on a color information and the distance information of the pixel of interest and a neighbor pixel of the pixel of interest; a parameter derivation unit configured to derive a parameter concerning a type of a region for the pixel based on the color information and the distance information of the pixel and the obtained reliability of the distance information; and a determination unit configured to determine a foreground region in the image using the derived parameter for each pixel of the image.

16 Claims, 11 Drawing Sheets

INPUT IMAGE
(FOREGROUND INCLUDES TEXTURE)

DISTANCE ESTIMATION
(AN EXAMPLE)

EXTRACTION RESULT
(RELATED ART)

EXTRACTION RESULT
(PRESENT INVENTION)

F I G. 11
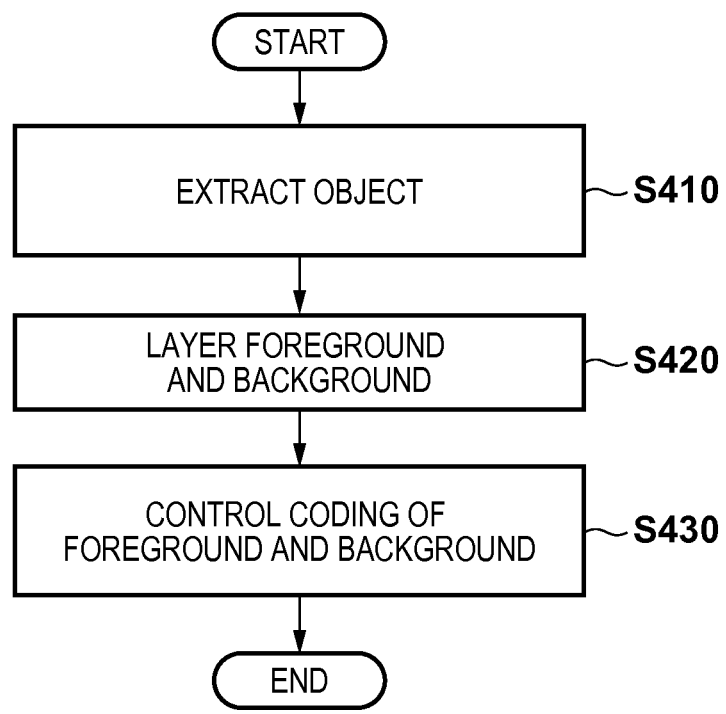

IMAGE PROCESSING APPARATUS AND IMAGE PROCESSING METHOD

BACKGROUND OF THE INVENTION

1. Field of the Invention

The present invention relates to an image processing technique and, more particularly, to a technique of more suitably extracting a foreground region from an image including the foreground region and a background region.

2. Description of the Related Art

Conventionally, studies on a technique of extracting a predetermined region (target region) from an image (also referred to as a segmentation technique) have been made and applied for the purpose of, for example, image synthesis or refocus on a specific region in video editing. The target region is an object to be extracted and will also be referred to as a foreground hereinafter. The target region extraction processing will also be referred to as foreground/background separation processing hereinafter.

For the target region extraction, the background subtraction method and the chroma-key method are well known as methods based on the color information of an image. In the background subtraction method, an image including not the target region but only the background is captured in advance. An image including the target region and the image including only the background are compared, and the difference between them is calculated, thereby extracting the target region. The chroma-key method is a standard method used in the movie industry, in which the background region is set to a predetermined color, and the target region is extracted assuming that the color of the target region does not include the background color. However, the background subtraction method or the chroma-key method is used only in an environment where the background is easy to control.

On the other hand, as a method that needs no specific background, there has been proposed a method called GRABCUT which manually gives coarse information including the target region in an image in advance, and separates the target region from an image having an arbitrary background (Rother et al., Grabcut: Interactive Foreground Extraction Using Iterated Graph Cuts, ACM Trans. Graph., vol. 23, No. 3, 2004, pp. 309-314 (Non-Patent Literature 1))). In this technique, color clustering is performed inside and outside the target region. Graph parameters are calculated based on the color information of each of the pixels and clusters. Minimization of the energy function of the graph is globally solved to extract the target region. The graph parameters include the similarities between neighbor pixels and the foreground likelihood and background likelihood of each pixel. In recent years, estimation of distance information (depth information) for each pixel of an image is enabled by equipping a monocular camera with a range image sensor. The distance information is used as useful information for target region extraction in addition to color information.

Current target region extraction methods using color information and distance information can roughly be classified into three types. The first method extends the feature dimensions from color information to distance information and apply color processing (C. Dal Mutto et al., Scene Segmentation by Color and Depth Information and its Applications, STDay 2010, 2010 (non-patent literature 2)). In this method, a feature amount is extracted from color information first. Then, a feature amount is extracted from distance information. These feature amounts are normalized, and conventional color processing is applied.

The second method performs processing using color information and processing using distance information, and weights the processing results (H. He et al., Graphcut-based Interactive Segmentation Using Colour and Depth Cues, Australasian Conference on Robotics and Automation (ACRA 2010), 2010 (non-patent literature 3) and Japanese Patent Laid-Open No. 2008-547097 (patent literature 1)). In this method, first, a rectangular region including the target region is designated. Next, clustering processing by color information is performed inside and outside the designated region, and the parameters of an energy function are set. Then, clustering processing by distance information is performed inside and outside the designated region, and the parameters of an energy function are set. The parameters set by the color information and those set by the distance information are weighted and determined. Finally, the energy function minimization problem is solved, thereby separating the foreground and the background.

The third method performs processing using color information and processing using distance information, and controls one of the processing results using the other (F. Calderero and F. Marques, Hierarchical Fusion of Color and Depth Information at Partition Level by Cooperative Region Merging, IEEE International Conference on Acoustics, Speech and Signal Processing (ICASSP 2009), (non-patent literature 4) and Japanese Patent Laid-Open No. 2009-282979 (patent literature 2)). In this method, first, clustering processing by color information is performed. Then, clustering processing by distance information is performed. Finally, the number of clusters of the color information is controlled or the pixels of the clusters of the color information are rearranged using the processing result of the distance information.

In the target region extraction technique using only color information, however, a target region extraction error occurs when the target region includes a texture, or the background includes a region of a color close to the foreground color. This problem also arises when an image is globally analyzed, as in the above-described GRABCUT technique.

FIG. 1 is a view illustrating an example of region extraction. An image 100a is an example of an input image that is a processing target. The foreground of the image 100a, which is the extraction target, includes a texture pattern in a partial region. The partial region has a color close to the color of the background. This is a very difficult situation in target region extraction. It is very hard to correctly set the parameters (for example, the similarity between pixels and the foreground likelihood and background likelihood of each pixel) of the energy function for a region of the target region where a texture structure exists, or the color is not uniform. As a result, it is difficult to appropriately extract the target region (foreground region) by GRABCUT processing using only color information.

In the image 100a, the dotted line indicates a manually designated region in GRABCUT processing. That is, the region outside the rectangular region indicated by the dotted line is the background region, and the inside region is the undetermined region. Each pixel in the undetermined region undergoes judging whether it is a foreground pixel or a background pixel.

An image 100c is an example of the extraction result obtained using the above-described GRABCUT technique. A portion judged as the target region is expressed by the color of the image example, and a portion judged as the background is expressed by white. As shown in FIG. 1, the target region is partially cut. A supposed reason for this is that the parameters of the energy function are set by processing based on color information. A pixel in a region that should primarily be part of the target region but has a color close to the background color tends to have a relationship closer to the background pixels in the neighborhood than the foreground pixels. Hence, this region is readily erroneously judged as the background upon solving the energy function minimization problem.

On the other hand, in the conventional target region extraction technique using distance information as well as an input image, the given distance information is used while regarding it as correct (while giving perfect credence). Since even incorrect distance information without sufficient accuracy is used with complete reliability, the foreground separation accuracy is not necessarily improved. In addition, since processing by color information and that by distance information are executed, the processing time is long.

An image 100b is an example of the result obtained by performing distance estimation for the image 100a. In the image 100b, the distance is expressed by the brightness. The higher the brightness is, the shorter (closer) the distance to the imaging device is. However, in the image 100b, a portion where the distance estimation cannot be done is expressed by the lowest brightness (black). In this example, to simplify the explanation of the feature of distance information, the target region portion, the boundary portion between the target region and the background, the background portion, and the low-luminance portion of the target region, are represented by uniform distance values, respectively. However, an actual distance-estimated image contains many noise components having different distance values on the pixel basis. As can be seen from the above-described example, the target region roughly has a close distance value independently of the structure, and a portion near the boundary between the target region and the background region or a low-luminance portion is difficult to estimate the correct distance.

SUMMARY OF THE INVENTION

The present invention provides a technique capable of more suitably determining and extracting a foreground region from an image including the foreground region and a background region.

According to an aspect of the present invention, an image processing apparatus comprises: a color information input unit configured to input color information of each pixel of an image; a distance information input unit configured to input distance information from a viewpoint for each pixel of the image; a reliability derivation unit configured to derive, for each pixel of the image as a pixel of interest, a reliability of the distance information of the pixel of interest based on the color information and the distance information of the pixel of interest and a neighbor pixel of the pixel of interest; a parameter derivation unit configured to derive, for each pixel of the image, a parameter concerning a type of a region for the pixel based on the color information and the distance information of the pixel and the reliability of the distance information obtained by the reliability derivation unit; and a determination unit configured to determine a foreground region in the image using the derived parameter for each pixel of the image.

According to another aspect of the present invention, an image processing apparatus comprises: a color information input unit configured to input color information of each pixel of an image of interest that is one of a plurality of images included in a multi-viewpoint image; a distance information input unit configured to input distance information from a viewpoint for each pixel of each image included in the multi-viewpoint image; a reliability derivation unit configured to derive, for each pixel of the image of interest as a pixel of interest, a reliability of the distance information of the pixel of interest based on the distance information of the pixel of interest in the image of interest and distance information of the pixel corresponding to the pixel of interest in another image included in the multi-viewpoint image; a parameter derivation unit configured to derive, for each pixel of the image of interest, a parameter concerning a type of a region for the pixel based on the color information and the distance information of the pixel and the reliability of the distance information obtained by the reliability derivation unit; and a determination unit configured to determine a foreground region in the image using the derived parameter for each pixel of the image.

The present invention can provide a technique capable of more suitably determining and extracting a foreground region from an image including the foreground region and a background region.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flowchart showing application to coding.

DESCRIPTION OF THE EMBODIMENTS

Preferred embodiments of the present invention will now be described in detail with reference to the accompanying drawings. Note that the following embodiments are not intended to limit the scope of the present invention, but are merely examples.

First Embodiment

An image processing apparatus according to the first embodiment of the present invention will be described below by exemplifying an imaging apparatus. An example will particularly be explained in which parameters of an energy function are derived based on color information, and the parameters are modified using the reliability of distance information.

<Arrangement of Apparatus>

Figure 2:
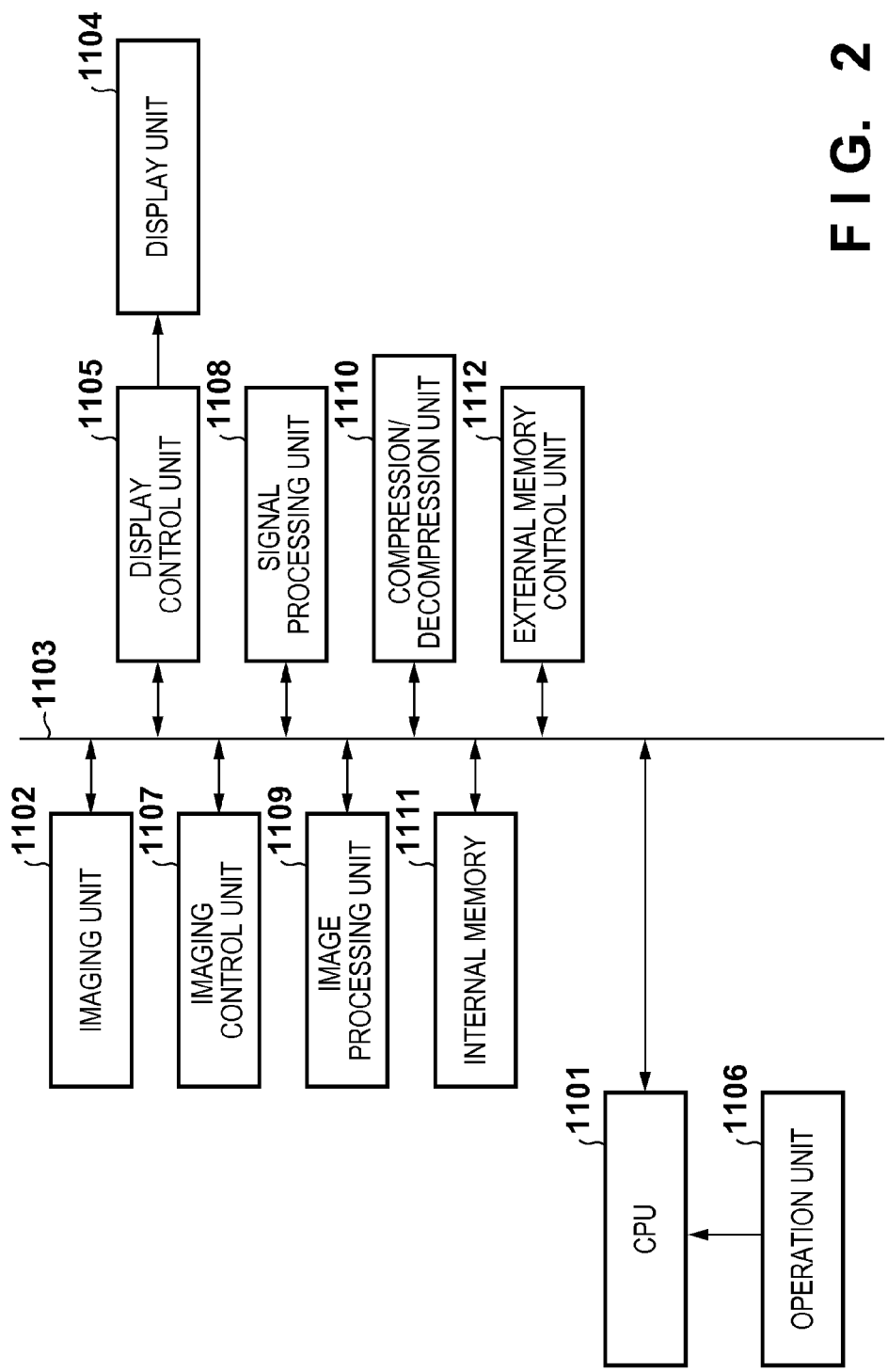
FIG. 2 is an overall block diagram of an imaging apparatus including an image processing apparatus according to the first embodiment.

FIG. 2 is a block diagram showing the arrangement of main units of an imaging apparatus of an embodiment that implements an image processing apparatus according to the first embodiment. A CPU (Central Processing Unit) 1101 comprehensively controls the units to be described below.

An imaging unit 1102 acquires the color information and the distance information of an image. In this case, assume that color information is input as general color image data, and distance information is input as range image data (for example, an image like an image 100b) whose pixels are assigned distance values.

A display unit 1104 displays a captured image or characters, and uses, for example, a liquid crystal display. The display unit 1104 may have a touch screen function. A display control unit 1105 controls display of the captured image or characters displayed on the display unit 1104. An operation unit 1106 receives a user instruction and includes buttons and an imaging mode dial. Contents set by the operation control predetermined processing via the CPU. For example, manual region designation to be described later can easily be implemented by using the display control unit 1105 and the operation unit 1106.

An imaging control unit 1107 controls the imaging system based on an instruction from the CPU 1101 to, for example, focus, open/close the shutter, or adjust the stop.

A signal processing unit 1108 performs various kinds of processing such as white balance processing, gamma processing, and noise reduction processing for digital data received via a bus 1103. An image processing unit 1109 performs image processing in accordance with an image acquired by the imaging unit 1102, a digital image output from the signal processing unit 1108, or a user designation output from the operation unit 1106. A compression/decompression unit 1110 controls conversion or coding of digital data or an image processing result into a file format such as JPEG, MPEG, or vectorization.

The bus 1103 is a transfer path of various kinds of data. For example, digital data acquired by the imaging unit 1102 is sent to a predetermined processing unit via the bus 1103. An internal memory 1111 functions as the main memory, work area, and the like of the CPU 1101, and also stores control programs and the like to be executed by the CPU 1101. An external memory control unit 1112 serves as an interface used to connect the imaging apparatus to a PC or other media (for example, hard disk, memory card, CF card, SD card, or USB memory).

Figure 3:
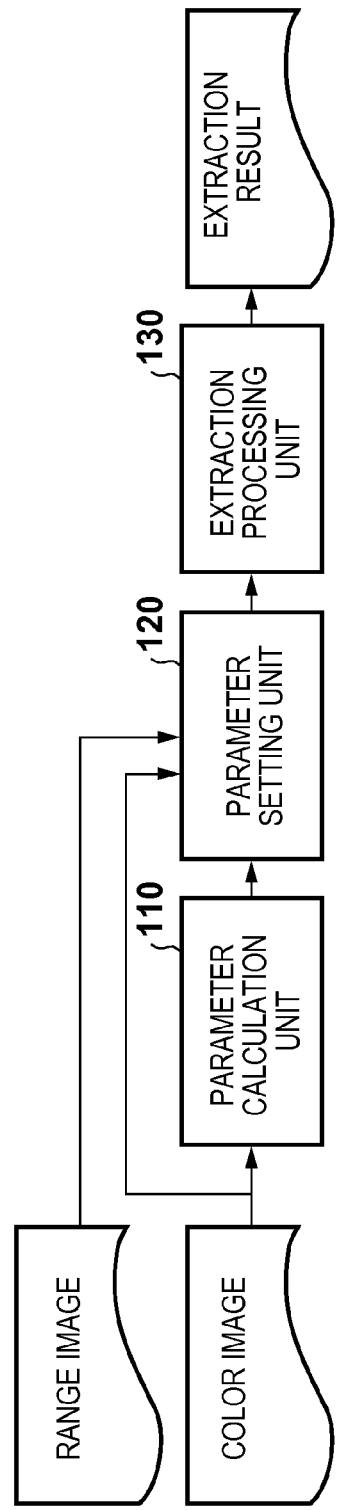
FIG. 3 is a functional block diagram of an image processing unit according to the first embodiment.

FIG. 3 is a block diagram showing the internal arrangement of the image processing unit of the imaging apparatus according to the first embodiment. Under the control of the CPU 1101, the image processing unit 1109 performs target region extraction for a processing target that is image data acquired by the imaging unit 1102 or image data stored in the internal memory 1111 or an external memory. The image processed by the image processing unit 1109 is, for example, transmitted to the compression/decompression unit 1110 and compression-coded, or stored in the internal memory 1111 or the external memory.

The image processing unit 1109 includes a parameter calculation unit 110, a parameter setting unit 120, and an extraction processing unit 130. Color information of an image represents, for example, the three primary color (RGB) values of each pixel. Distance information corresponds to the distance (depth) of each pixel from the viewpoint.

Note that the distance information can be measured by a sensor or the like or estimated from a plurality of images. The distance information may be generated by causing the user to designate a distance for each region of image data or performing estimation of distance information described as a related art. Since distance information includes data interpolated by the estimation, range image data can include wrong distance information.

The parameter calculation unit 110 (parameter derivation unit) calculates parameters for extraction processing using the color information of an input image. More specifically, the parameter calculation unit 110 performs clustering processing of dividing a processing target image into a plurality of color regions, and calculates, for each pixel, parameters such as the similarity to a neighbor pixel, the foreground likelihood, and the background likelihood for extraction processing based on the color information of each pixel and that of each cluster.

The parameter setting unit 120 analyzes whether the color information and distance information of the input image match, modifies the parameters for extraction processing calculated by the parameter calculation unit 110, and sets the parameters.

The extraction processing unit 130 separates a foreground image region (to be simply referred to as a foreground region hereinafter) and a background image region (to be simply referred to as a background region hereinafter) using the parameters set by the parameter setting unit 120, and extracts, for example, only the foreground image region. In the first embodiment, the image processing apparatus (image processing unit 1109) of the present invention is described as a constituent element of the imaging apparatus. However, the image processing apparatus may be formed as a separate (stand alone) apparatus. For example, the image processing apparatus can be implemented by causing a personal computer (PC) to function as the above-described units by executing an image processing software program.

<Operation of Apparatus>

Figure 4:
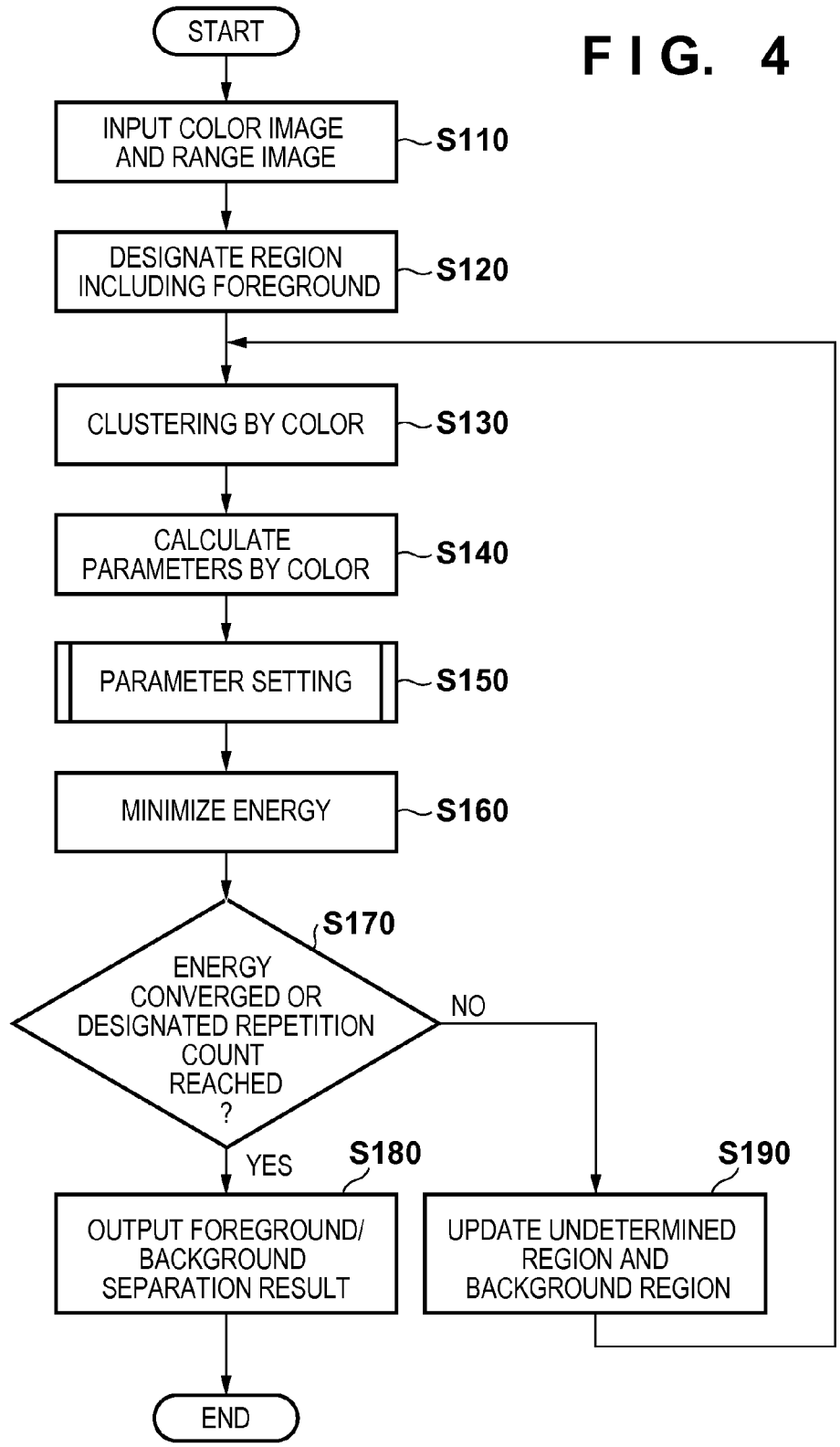
FIG. 4 is a flowchart of image processing according to the first embodiment.

FIG. 4 is a flowchart showing processing of obtaining a target region extraction result from an input image in the image processing unit according to the first embodiment.

In step S110, the color information of a processing target image and distance information of each pixel included in the image are input as image data and range image data, respectively.

In step S120, a region surrounding the extraction target region is designated out of the image region represented by the image data input in step S110. This designation is done by, for example, causing the user to designate a rectangular region surrounding the extraction target region via a GUI (Graphical User Interface). That is, the region outside the designated region does not include the foreground region. The respective pixels outside the designated region are processed as the pixels of the background region (background pixels). The designated region is an undetermined region (also called a foreground candidate region) which is not determined as the background or foreground yet at this point of time. Each pixel inside the undetermined region may be a background pixel or a pixel of the foreground region, and undergoes judgment processing to be described below.

In step S130, clustering processing of the background region and the undetermined region of the image is performed. The clustering processing is performed independently for the background region and the undetermined region. The background region is divided into several background clusters having different color characteristics based on the color distribution of the background region. The undetermined region is also divided into several foreground candidate clusters in a similar manner. The clustering processing can be performed using a known method of estimating a Gaussian mixture distribution.

In step S140, the parameter calculation unit 110 derives parameters for a pixel of interest based on the color information and distance information of the pixel of interest and those of neighbor pixels. More specifically, the parameter calculation unit 110 calculates the parameters of an energy function. Note that similarity N: the similarity of the pixel of interest to a neighbor pixel, background likelihood Lb: a degree of closeness of the pixel of interest to the background, and foreground likelihood Lf: a degree of closeness of the pixel of interest to the foreground are used as the parameters here. Only some of them may be used as the parameters. Note that details of the processing in step S140 will be described later.

In step S150, the parameter setting unit 120 analyzes the color information and distance information of each pixel, judges whether to modify the parameters of each pixel calculated in step S140, modifies the parameters as needed, and sets the parameters. Details of the processing will be described later.

In step S160, the extraction processing unit 130 solves the energy function minimization problem using the parameters modified and set in step S150, and cuts the foreground region and the background region. The energy function minimization is a network flow problem of the graph theory, and can use the known Ford-Fulkerson algorithm or the like.

In step S170, it is judged whether the flow of the energy function becomes small or reaches a designated repetition count. If one of the above-described conditions is met, the process advances to step S180 to output the foreground/background separation result. If neither of the above-described conditions is met, the process advances to step S190 to set the foreground region and the background region cut by the energy function minimization processing as a new undetermined region and a determined background region, respectively. The process returns to step S130 to repeat the processing up to step S160.

<Energy Function Parameter Calculation Processing (Step S140)>

Details of the energy function parameter calculation processing according to the first embodiment will be described. As described above, the similarity N between the pixel of interest and a neighbor pixel is based on the color information relationship between them and calculated by $$N(m, n) = \frac{\gamma}{dist(m, n)} e^{-\beta \|Z_m - Z_n\|^2} \quad (1)$$

$$\beta = \frac{1}{2\langle \|Z_m - Z_n\|^2 \rangle}$$

where γ is a preset value, dist is the physical distance between neighbor pixels m and n, and |Zm−Zn| is the color distance (=color difference) between the neighbor pixels. That is, the closer the colors of the pixels is, the higher the similarity is.

On the other hand, the background likelihood Lb is a value representing the degree of likelihood that the pixel of interest is a background pixel, and the foreground likelihood Lf is a value representing the degree of likelihood that the pixel of interest is a foreground pixel, which are calculated by $$L(m) = -\log \sum_{i=1}^{K} \pi_i \frac{1}{\sqrt{\det \Sigma_i}} e^{\left(-\frac{1}{2}[Z_m - \mu_i]^T \Sigma_i^{-1} [Z_m - \mu_i]\right)} \quad (2)$$

where Zm is the color vector of the pixel of interest, μi is the average color vector of a cluster i, Σi is the eigenvector of the cluster i, πi is the weighting coefficient of the pixel, and K is the maximum value of the cluster number.

The foreground likelihood and the background likelihood of a pixel depend on the clustering processing results of the foreground region and the undetermined region. The background likelihood Lb(m) of a pixel is calculated by equation (2) based on the color information of the pixel and the color information of each cluster of the background region. Similarly, the foreground likelihood Lf(m) of a pixel is calculated based on the color information of the pixel and the color information of each cluster of the undetermined region.

<Parameter Modification/Setting Processing (Detailed Processing in Step S150)>

Figure 5:
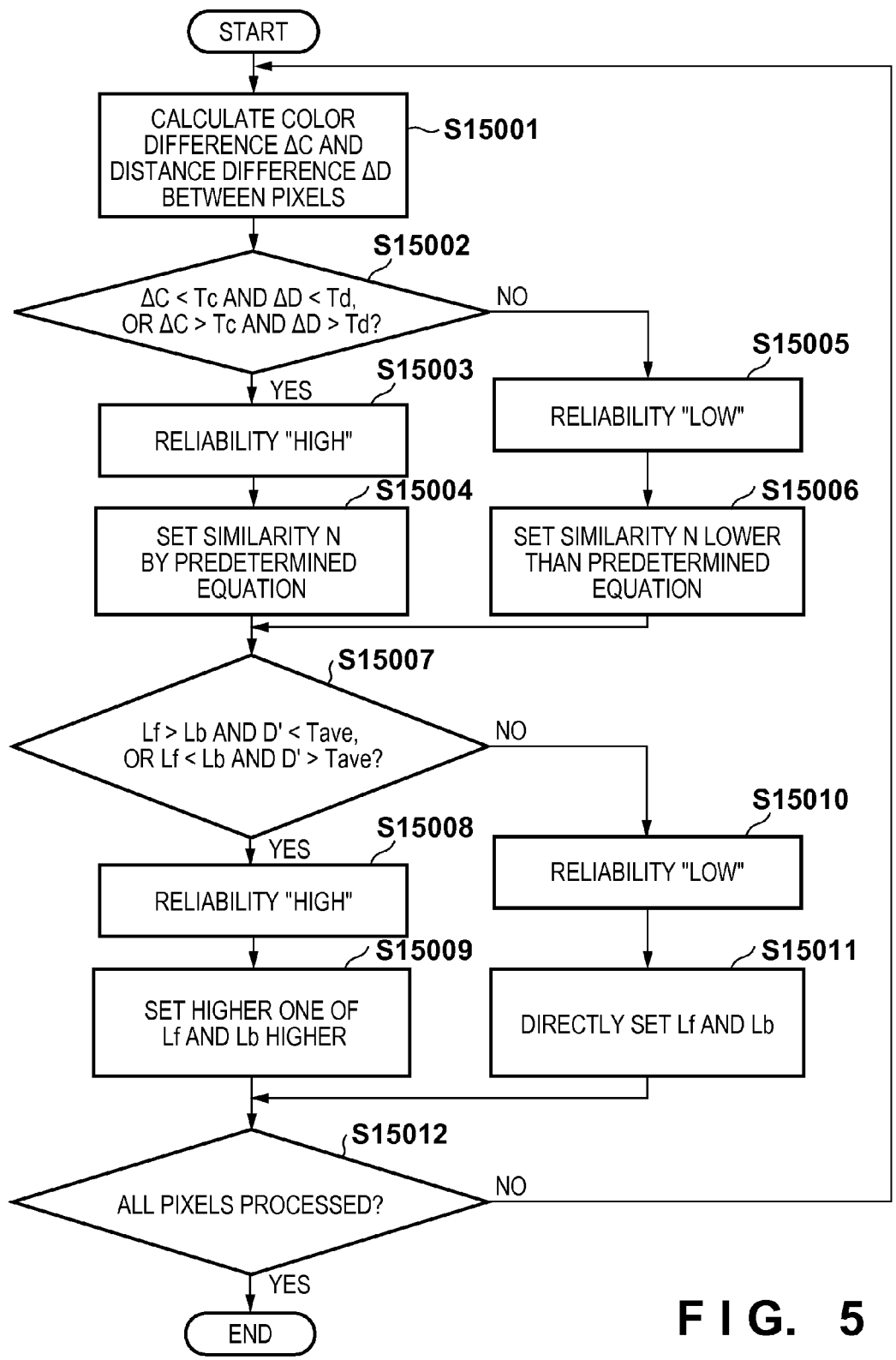
FIG. 5 is a flowchart showing parameter setting processing according to the first embodiment.

FIG. 5 is a flowchart showing details of the parameter setting processing according to the first embodiment. In the steps to be described below, the similarity between pixels is modified based on the color information difference (color difference) and the distance information difference (distance difference) between the pixel of interest and a neighbor pixel in steps S15001 to S15006. In steps S15007 to S15011, the foreground likelihood and the background likelihood of the pixel of interest are modified based on the reliability of the distance information.

In step S15001, the color information and distance information of the pixel of interest are compared with those of a neighbor pixel. More specifically, a color information difference ΔC and a distance information difference ΔD between the pixel of interest and the neighbor pixel are calculated. The color information difference and the distance information difference may be Euclidean distances or other distances. The smaller the color information difference between pixels is, the higher the similarity between the colors of the pixels is. Similarly, the smaller the distance information difference between pixels is, the shorter the distance between the pixels is.

In step S15002, the reliability of the distance information for the pixel of interest is derived from the calculated color information difference ΔC and distance information difference ΔD (reliability derivation unit). More specifically, if the color information difference ΔC is smaller than a preset threshold Tc (first predetermined value), and the distance information difference ΔD is also smaller than a preset threshold Td (second predetermined value), the process advances to step S15003. If the color information difference ΔC is larger than the preset threshold Tc, and the distance information difference AD is also larger than the preset threshold Td, the process advances to step S15003 as well. If neither condition is met, the process advances to step S15005. Note that to more accurately judge the reliability, the threshold Tc of the color information difference between the pixels and the threshold Td of the distance information difference may be set smaller.

In step S15003, since the magnitude relationships of the color information difference and the distance information difference match, the reliability of the distance information is judged to be high. In step S15004, the similarity N is calculated in accordance with a predetermined equation.

In step S15005, since the magnitude relationships of the color information difference and the distance information difference do not match, the reliability of the distance information is judged to be low. That is, if distance information difference is small although the color information difference is large, or if distance information difference is large although the color information difference is small, the distance information of the current pixel of interest is regarded not to be always reliable (may be wrong). In step S15006, the similarity N lower than the similarity calculated in accordance with the predetermined equation used in step S15004 is derived.

Note that as the modification amount of the similarity between the pixels, a preset value or an amount corresponding to the standard deviation of the similarity between the pixels can be used. That is, it is necessary to only modify the similarity such that the similarity for a pixel having a relatively high distance information reliability becomes relatively high.

In step S15007, if the foreground likelihood Lf calculated for the current pixel of interest is higher than the background likelihood Lb, and distance information D' of the pixel of interest is smaller than a threshold Tave (third predetermined value), the process advances to step S15008. If the calculated foreground likelihood Lf is lower than the background likelihood Lb, and the distance information D' of the pixel of interest is larger than the threshold Tave, the process advances to step S15008 as well. If neither condition is met, the process advances to step S15010.

In step S15008, the reliability of the distance information is judged to be high. In step S15009, the higher one of the foreground likelihood Lf and the background likelihood Lb of the pixel of interest is modified and set higher. More specifically, if the foreground likelihood Lf is higher than the background likelihood Lb, the foreground likelihood Lf is modified and set higher. If the background likelihood Lb is higher than the foreground likelihood Lf, the background likelihood Lb is modified and set higher. That is, the above-described criteria are set based on the fact that a pixel in the foreground region has distance information smaller than that of a pixel in the background region, and the value of the foreground likelihood tends to be larger than that of the background likelihood. Note that the threshold Tave of the distance information can be set as the average value of the distance information of the pixels of the image or by another setting method. As the modification amount of the foreground likelihood or background likelihood of the pixel, a preset value or the standard deviation of the foreground likelihood or background likelihood of the pixel can be used. That is, it is necessary to only modify the background likelihood or foreground likelihood such that the difference between the background likelihood and the foreground likelihood of a pixel having a relatively high distance information reliability becomes relatively large.

In step S15010, the reliability based on the color information and the distance information is judged to be low. In step S15011, the calculated values of the foreground likelihood and the background likelihood are directly set. That is, the values are not modified. Note that when the reliability is low, the higher one of the foreground likelihood and the background likelihood may be modified lower in step S15011.

In step S15012, it is checked whether all pixels in the undetermined region have been processed. If an unprocessed pixel remains, the process returns to step S15001 to repeat the above-described modification processing. If no unprocessed pixel exists, the processing ends.

<Example of Processing Result>

Figure 1:
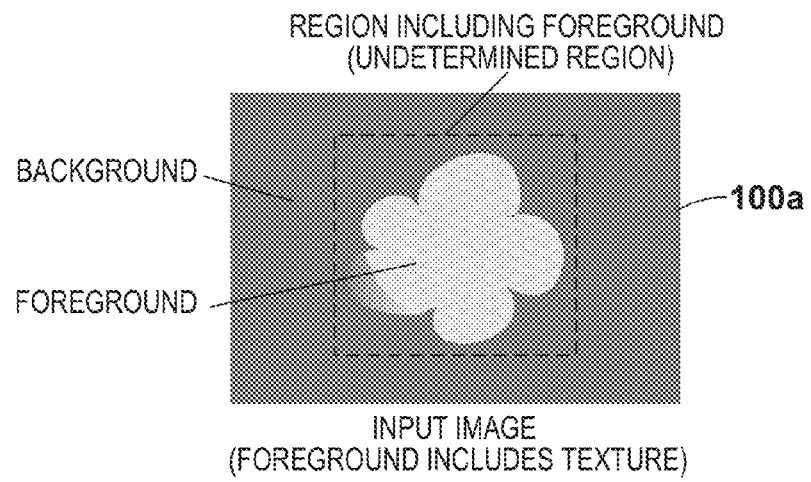
FIG. 1 is a view showing an example of foreground region extraction.
Figure 1:
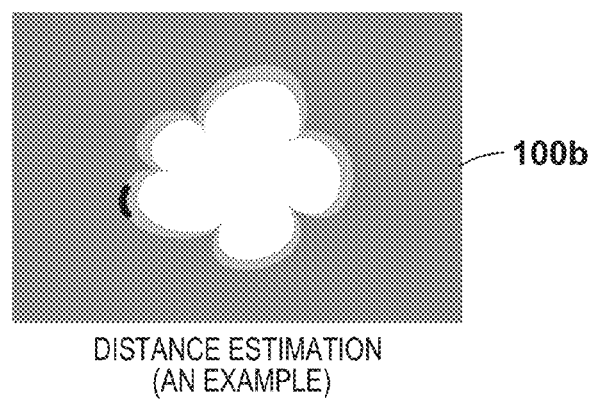
Figure 1:
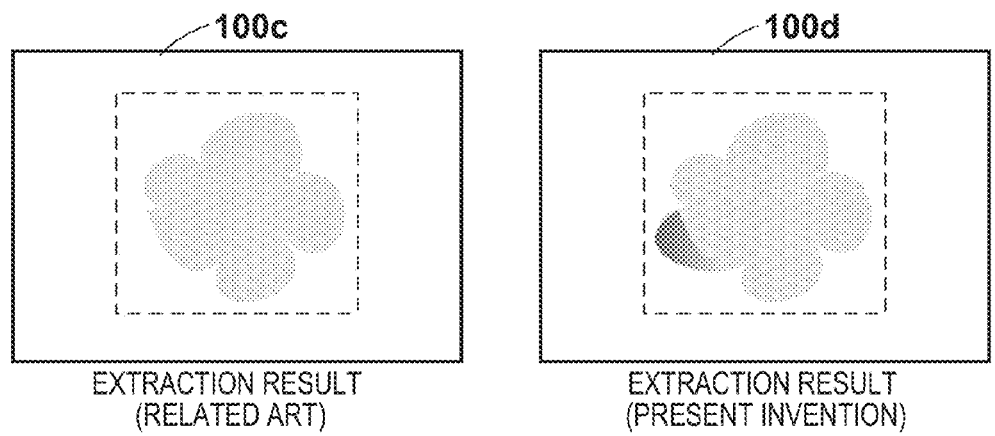

An image 100d shown in FIG. 1 illustrates an extraction result by the image processing unit 1109 according to the first embodiment. As is apparent from FIG. 1, the foreground is more suitably judged and extracted as compared to an image 100c that is a result obtained by directly applying the GRAB-CUT technique.

That is, in the first embodiment, it is judged whether the magnitude relationships of the color information difference and the distance information difference match. If the relationships match, the similarity difference between the pixels is made large, and the foreground likelihood and the background likelihood are modified (set) such that the difference between the foreground likelihood and the background likelihood of the pixel becomes large. This makes it possible to accurately extract a target region even from a complex image.

As described above, according to the first embodiment, in the foreground extraction processing using distance information in addition to color information, the parameters to be used to judge whether a pixel is a foreground pixel are modified based on the reliability of the distance information. This enables to more accurately determine the foreground region even in a complex foreground image. Particularly, in the first embodiment, although the distance information is used in addition to the color information, the processing (step S160) of solving the energy function minimization problem where the processing load is relatively large is executed only for the color information. For this reason, the increase in the processing load can be suppressed to a minimum.

Note that in the first embodiment, an example has been described in which the parameters of the energy function are calculated from the color information first, and the reliability is then analyzed from the color information and the distance information, thereby setting the parameters calculated from the color information. However, clustering may be performed first inside and outside the designated region based on the distance information, the parameters of the energy function may then be calculated, and the reliability may finally be analyzed from the color information and the distance information, thereby modifying and setting the parameters calculated from the distance information.

Second Embodiment

In the second embodiment, the parameters of an energy function are calculated using both color information and distance information. An example will be described in which the reliability of the distance information is determined, thereby determining the weights of the parameters by the color information and those by the distance information and setting the parameters of the energy function.

Figure 6:
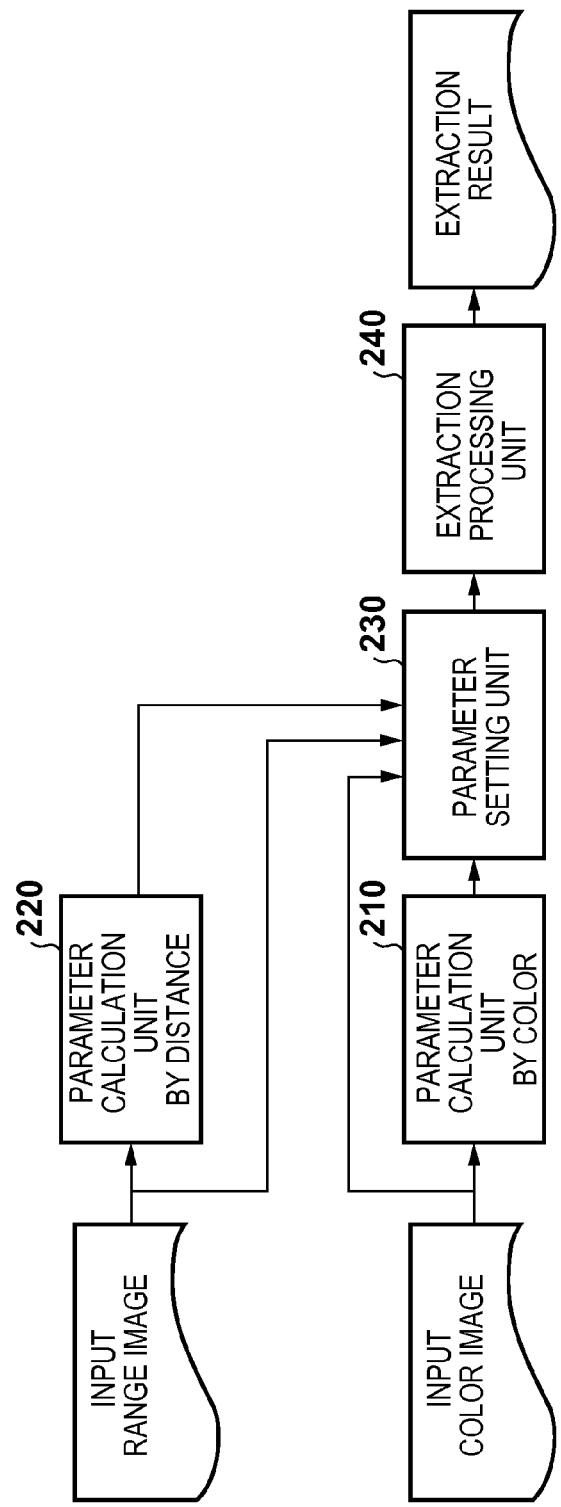
FIG. 6 is a functional block diagram of an image processing unit according to the second embodiment.

FIG. 6 is a block diagram showing the arrangement of an image processing unit 1109 according to the embodiment of the present invention. Note that the overall arrangement is the same as that of the first embodiment (FIG. 2), and a description thereof will be omitted.

<Device Arrangement of Image Processing Unit>

The image processing unit 1109 includes a parameter calculation unit 210, a parameter calculation unit 220, a parameter setting unit 230 using reliability analysis from color information and distance information, and an extraction processing unit 240.

The parameter calculation unit 210 calculates parameters for extraction processing using the color information of an input image. More specifically, the parameter calculation unit 210 performs clustering processing of dividing an image into a plurality of color regions, and calculates, for each pixel, parameters such as the similarity to a neighbor pixel, the background likelihood, and the foreground likelihood for extraction processing based on the color information of each pixel and that of each cluster.

The parameter calculation unit 220 calculates parameters for extraction processing using the distance information of the input image. More specifically, the parameter calculation unit 220 performs clustering processing of dividing the image into a plurality of distance regions, and calculates, for each pixel, parameters such as the similarity to a neighbor pixel, the background likelihood, and the foreground likelihood for extraction processing based on the distance information of each pixel and that of each cluster.

The parameter setting unit 230 analyzes whether the color information and distance information of the input image match. More specifically, the parameter setting unit 230 determines the weights of the parameters of each pixel calculated by the parameter calculation unit 210 and the parameters of each pixel calculated by the parameter calculation unit 220 and sets the parameters for extraction processing.

The extraction processing unit 240 separates a foreground and a background using the parameters set by the parameter setting unit 230.

<Operation of Image Processing Unit>

Figure 7:
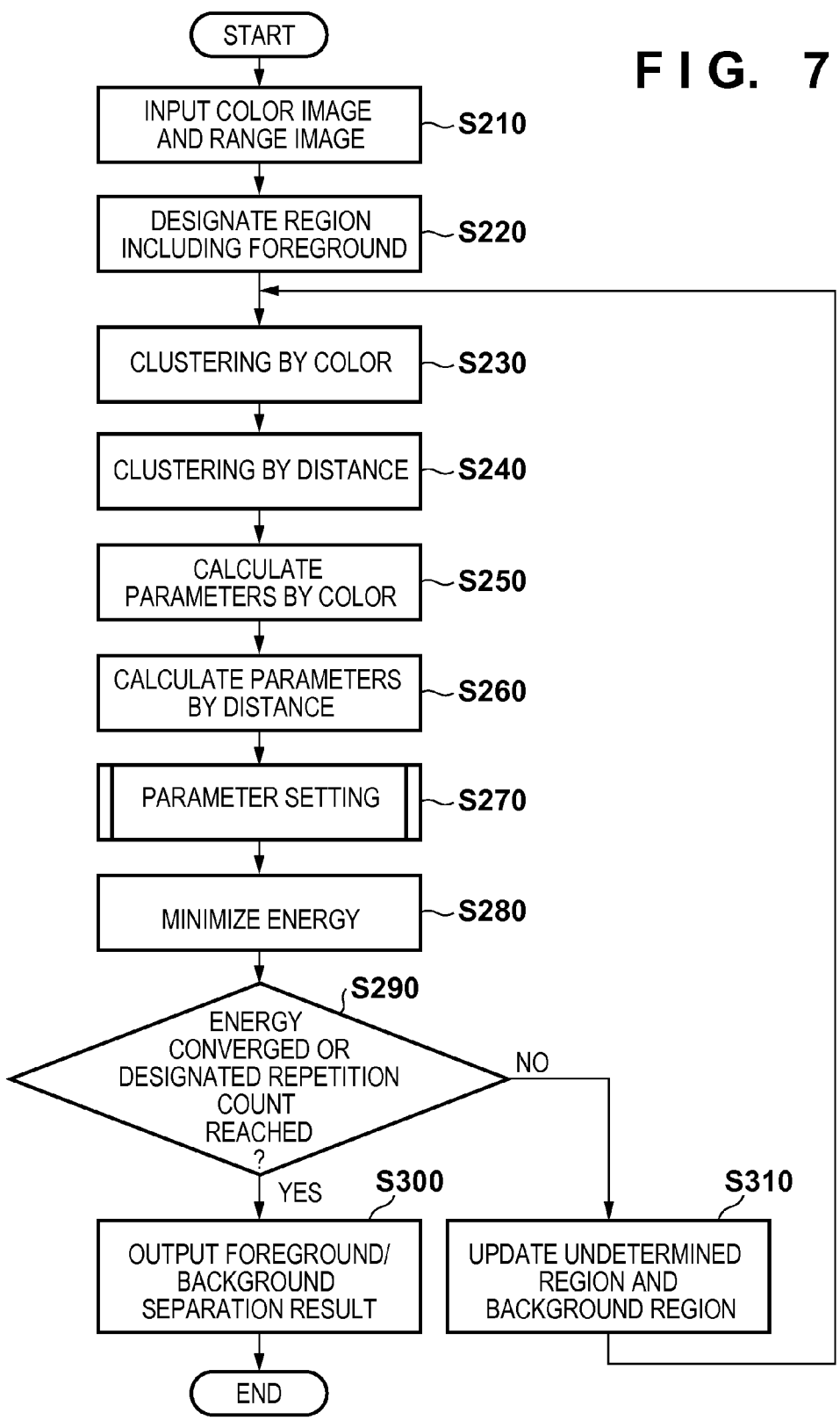
FIG. 7 is a flowchart of image processing according to the second embodiment.

FIG. 7 is a flowchart showing processing of the image processing unit according to the second embodiment.

In step S210, the color information and distance information of a processing target image are input. In step S220, a region of the image where the target region is included is designated. The region outside the designated rectangular region is the background region, and the region inside the designated rectangular region is the undetermined region. In step S230, clustering processing of the background region and the undetermined region of the image is performed. In step S240, clustering processing of the background region and the undetermined region is performed in the range image.

In step S250, the parameters of the energy function are calculated based on the clustering result of the image. As in the first embodiment, the parameters are the similarity between the pixel of interest and a neighbor pixel, and the background likelihood and foreground likelihood of the pixel of interest. In step S260, the parameters of the energy function are calculated based on the clustering result of the range image.

In step S270, the color information and distance information of each pixel are analyzed, the weights of parameters of each pixel calculated based on the color information in step S250 and the parameters of each pixel calculated based on the distance information in step S260 are determined, and the parameters of the energy function are set. Details of this processing will be described later.

In step S280, the energy function minimization problem is solved using the parameters set in step S270, and the foreground region and the background region are cut.

In step S290, it is judged whether the flow of the energy function becomes small or reaches a designated repetition count. If neither of the above-described conditions is met, the process advances to step S310. In step S310, the foreground region and the background region cut by the energy function minimization processing are set as a new undetermined region and a determined background region, respectively. The process returns to step S230 to repeat the processing up to step S280. If one of the above-described conditions is met in step S290, the foreground/background separation result is output in step S300.

<Parameter Modification/Setting Processing (Detailed Processing in Step S270)>

Figure 8:
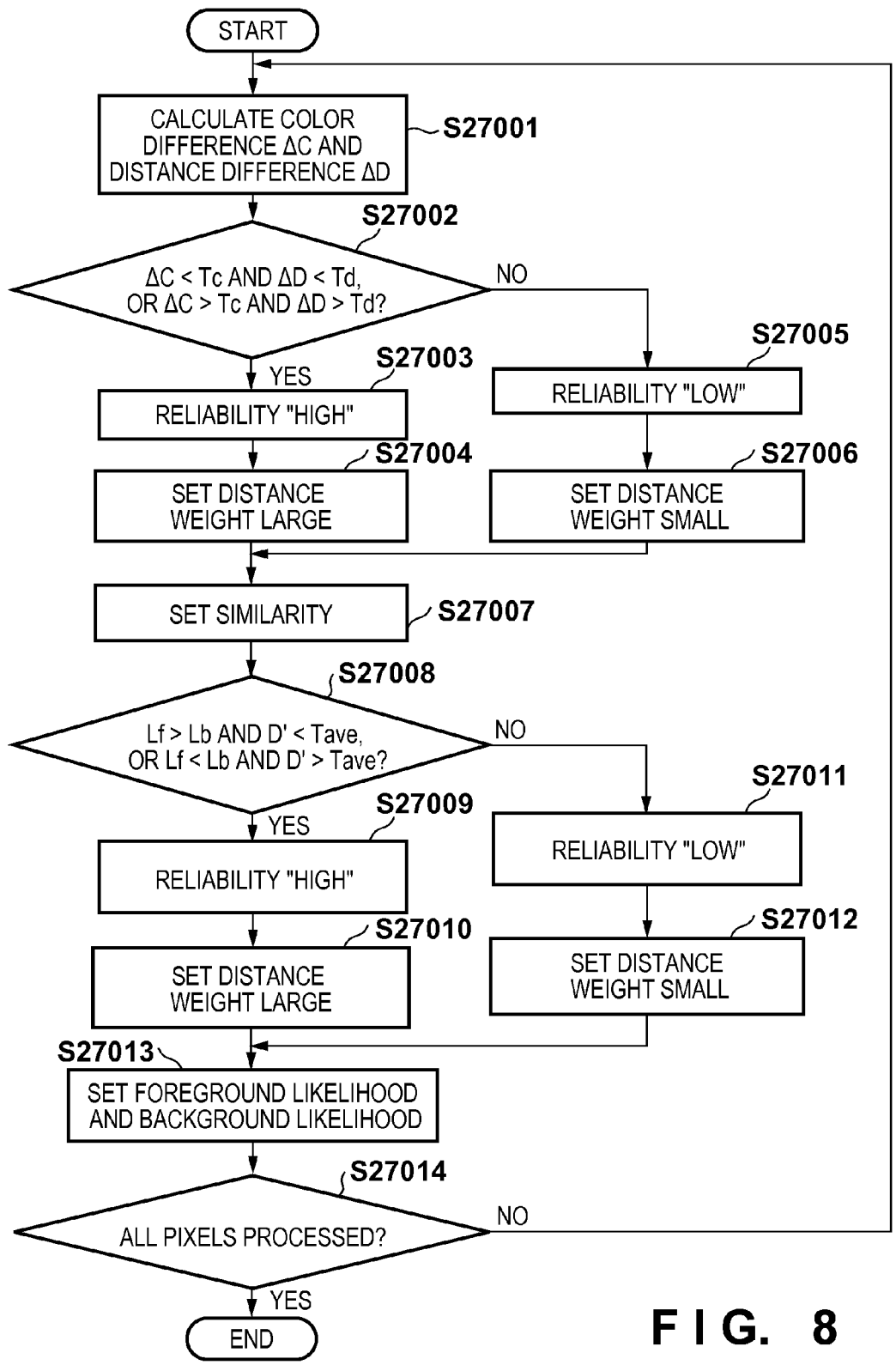
FIG. 8 is a flowchart showing parameter setting processing according to the second embodiment.

FIG. 8 is a flowchart showing details of the parameter setting processing according to the second embodiment.

In steps S27001 to S27007, the similarity between pixels is set based on the color information difference and the distance information difference between the pixel of interest and a neighbor pixel.

In step S27001, a color information difference $\Delta C$ and a distance information difference $\Delta D$ between the pixel of interest and a neighbor pixel are calculated. The smaller the color information difference is, the higher the similarity between the colors of pixels is. Similarly, the smaller the distance information difference between pixels is, the shorter the distance between the pixels is. In step S27002, the reliability based on the color information and distance information of the pixel is judged from the calculated color information difference $\Delta C$ and distance information difference $\Delta D$ between the pixels. More specifically, if the color information difference $\Delta C$ is smaller than a preset threshold Tc (first predetermined value), and the distance information difference $\Delta D$ is also smaller than a preset threshold Td (second predetermined value), the process advances to step S27003. If the color information difference $\Delta C$ is larger than the preset threshold Tc, and the distance information difference $\Delta D$ is also larger than the preset threshold Td, the process advances to step S27003 as well. If neither condition is met, the process advances to step S27005.

In step S27003, since the magnitude relationships of the color information difference and the distance information difference match, the reliability of the distance information is judged to be high. In step S27004, the weight of the distance information is set to a larger numerical value. On the other hand, in step S27005, since the magnitude relationships of the color information difference and the distance information difference do not match, the reliability of the distance information is judged to be low. In step S27006, the weight of the distance information is set to a smaller numerical value. In step S27007, the similarity between the pixels calculated from the color information and the similarity between the pixels calculated from the distance information are set by the determined weights. Note that instead of controlling the weight of the distance information, the weight of the color information may be modified.

In step S27008, if a foreground likelihood Lf calculated for the current pixel of interest is higher than a background likelihood Lb, and distance information D' of the pixel of interest is smaller than a threshold Tave (third predetermined value), the process advances to step S27009. If the calculated foreground likelihood Lf is lower than the background likelihood Lb, and the distance information D' of the pixel of interest is larger than the threshold Tave, the process advances to step S27009 as well. If neither condition is met, the process advances to step S27011.

In step S27009, the reliability of the distance information is judged to be high. In step S27010, the weight of the distance information is set to a larger numerical value. On the other hand, in step S27011, the reliability of the distance information is judged to be low. In step S27012, the weight of the distance information is set to a smaller numerical value. In step S27013, the foreground likelihood and background likelihood of the pixel calculated from the color information and the foreground likelihood and background likelihood calculated from the distance information are calculated using the determined weights. Note that instead of controlling the weight of the distance information, the weight of the color information may be modified.

In step S27014, it is checked whether all pixels in the undetermined region have been processed. If an unprocessed pixel remains, the process returns to step S27001 to repeat the above-described modification processing. If no unprocessed pixel exists, the processing ends.

In the second embodiment, the parameters of an energy function including the similarity between pixels and the foreground likelihood and background likelihood of a pixel are calculated from color information and distance information. An example has been described in which the weight of the distance information is determined based on the reliability of the distance information, and the parameters of the energy function are set.

Third Embodiment

In the third embodiment, an example will be described in which a foreground image region is determined for an image of interest that is one of a plurality of images included in a multi-viewpoint image. The third embodiment is different from the above-described first and second embodiments in the method of deriving the reliability of distance information.

<Device Arrangement of Image Processing Unit>

Figure 9:
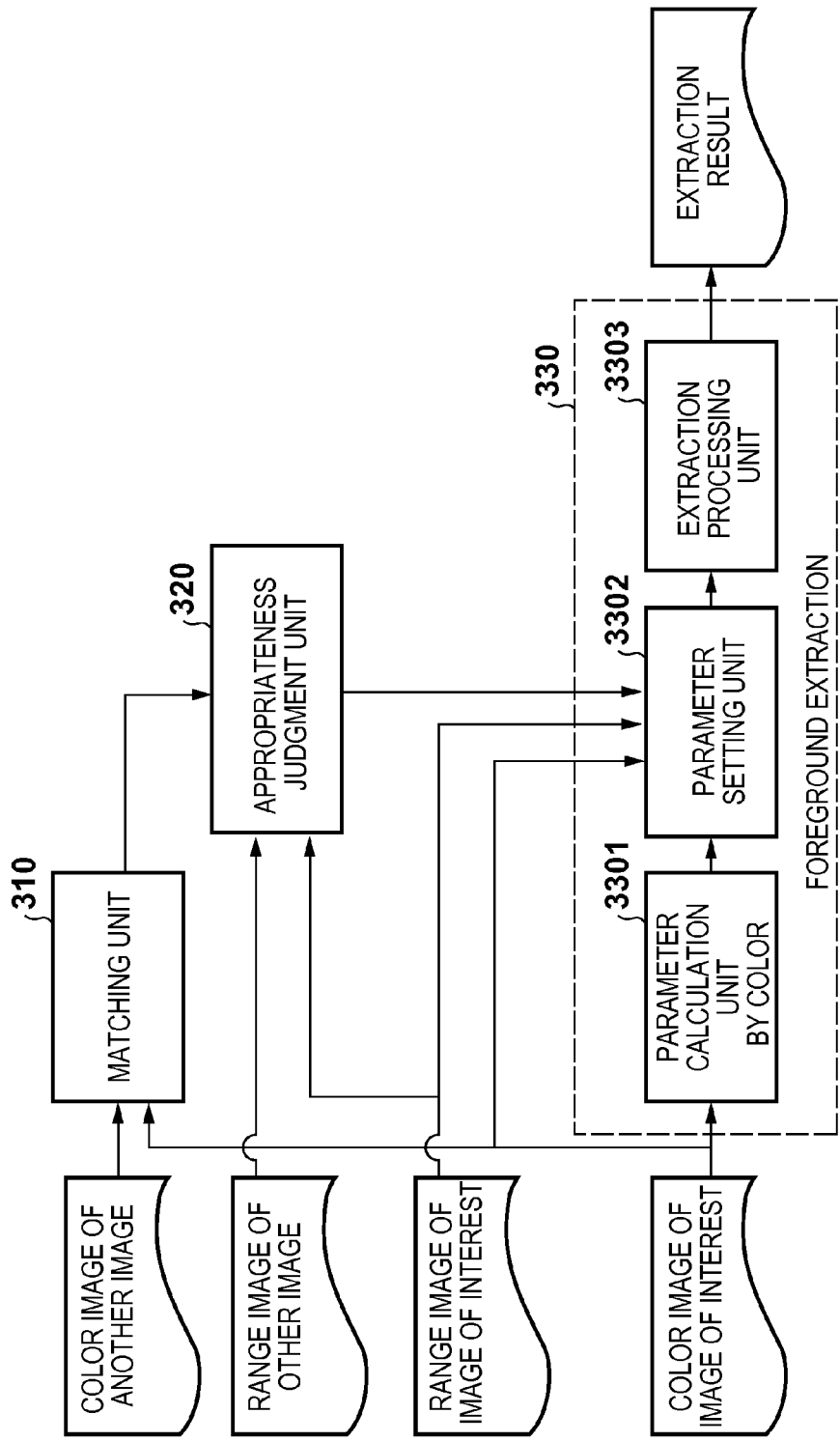
FIG. 9 is a block diagram of an image processing unit according to application to multi-viewpoint image processing.

FIG. 9 is a block diagram showing the arrangement of an image processing unit applied to a multi-viewpoint image.

The image processing unit includes a matching unit 310 that performs matching processing between an processing target image and a peripheral image, a appropriateness judgment unit 320, an a target region extraction unit 330. The target region extraction unit 330 has the same arrangement as that of the image processing unit of the above-described first or second embodiment, and includes a parameter calculation unit 3301, a parameter setting unit 3302, and an extraction processing unit 3303.

The matching unit 310 acquires the position correspondence relationship between each pixel of an image of interest that is the processing target and each pixel of another image included in the above-described multi-viewpoint image. This matching processing, that is, the alignment processing can use known feature-based matching or region-based matching. The appropriateness judgment unit 320 compares the range image of the image of interest with the range image of another image included in the multi-viewpoint image, thereby deriving the reliability of the range image. Upon judging that the distance information of the pixel of interest is appropriate, the target region extraction unit 330 further analyzes the reliability based on the color information and distance information of the pixel of interest, modifies the calculated parameters, and sets the parameters. On the other hand, upon judging that the distance information of the pixel of interest is not appropriate, the target region extraction unit 330 directly sets the calculated parameters.

<Operation of Image Processing Unit>

Figure 10:
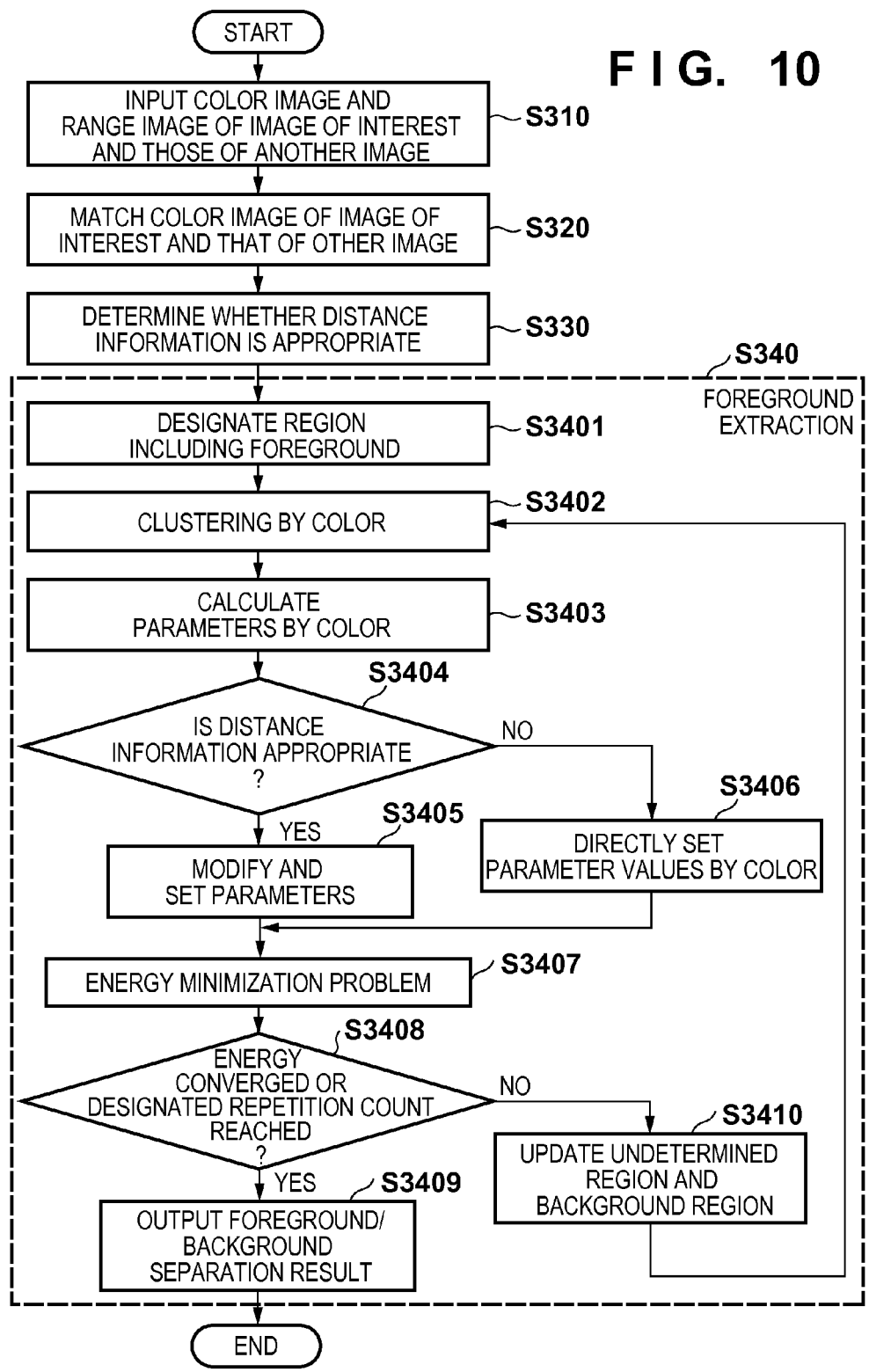
FIG. 10 is a flowchart showing multi-viewpoint image processing.

FIG. 10 is a flowchart of image processing applied to a multi-viewpoint image.

In step S310, the color information and distance information of an image of interest that is the processing target and the color information and distance information of another image included in the above-described multi-viewpoint image are input. In step S320, matching processing between the color information of the image of interest and the color information of the other image is performed to acquire the position correspondence relationship between the images for each pixel.

In step S330, the range image of the image of interest is compared with the range image of the other image, thereby judging whether the distance information of each pixel of the image of interest is appropriate for reliability analysis. More specifically, if the difference between the distance information of the pixel of interest in the image of interest and the distance information in the other image is smaller than a preset threshold (predetermined value), the distance information of the pixel of interest is assumed to be stable and judged to be usable for reliability analysis. On the other hand, if the difference between the distance information of the pixel of interest in the image of interest and the distance information in the other image is larger than the preset threshold, the distance information of the pixel of interest is assumed to be unstable and judged not to be used for reliability analysis (or to make the weight small).

In step S340, target region extraction processing is performed using the distance information judged to be appropriate. Step S340 will be described below in more detail.

In step S3401, a region including the target region is designated. In step S3402, clustering of the background region and the undetermined region of the processing target is performed. In step S3403, the parameters of the energy function are calculated based on the color information of the pixel of interest.

In step S3404, the result of judging whether the distance information is appropriate for reliability analysis processing is used. If the distance information of the pixel is appropriate for reliability analysis processing, the color information and distance information of the current pixel of interest are further analyzed in step S3405. It is judged whether to modify the parameters calculated in step S3403, and the parameters are modified and set as needed. If the distance information of the pixel is not appropriate for reliability analysis processing, the parameters calculated in step S3403 are directly set as parameter values in step S3406.

In step S3407, the energy function minimization problem is solved using the set parameters, and the foreground region and the background region are cut. In step S3408, it is judged whether the flow of the energy function becomes small or reaches a designated repetition count. If one of the above-described conditions is met, the process advances to step S3409 to output the foreground/background separation result. On the other hand, if neither of the above-described conditions is met, the process advances to step S3410 to set the foreground region and the background region cut by the energy function minimization processing as a new undetermined region and a determined background region, respectively. The process returns to step S3402 to repeat the processing up to step S3407.

As described above, in the third embodiment, the reliability of the distance information of a pixel of interest in an image of interest is judged based on the distance information in the image of interest and another image included in a multi-viewpoint image. Note that in the above description, a plurality of images are used as the multi-viewpoint image. However, for example, a plurality of frame images included in a moving image may be used.

Fourth Embodiment

In the fourth embodiment, an example of application to image compression coding will be described.

FIG. 11 is a flowchart of a case in which target region extraction processing according to the above-described embodiments is applied to coding.

In step S410, a foreground region is extracted from a processing target image based on the image processing unit according to the above-described embodiments.

In step S420, the foreground region and the background region are layered based on the foreground region extraction result. In this processing, the separated foreground region and background region are defined as different layers, and the color information of each pixel belonging to the foreground region is recorded in the foreground layer, and the color information of each pixel belonging to the background region is recorded in the background layer.

In step S430, coding of the foreground region and the background region is controlled. In this processing, particularly, the foreground region is regarded as a region where the image quality needs to be emphasized and compressed at a compression ratio lower than a normal compression ratio. On the other hand, the background region is compressed at a compression ratio higher than the normal compression ratio (compression coding unit).

Such compression coding control allows to compress an image at a higher compression ratio while suppressing degradation in image quality. This control is also usable for focus processing of placing focus on an arbitrary portion such as a target region or background and throwing the other portions out of focus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-289895, filed Dec. 28, 2011, which is hereby incorporated by reference herein in its entirety.

What is claimed is:

1. An image processing apparatus comprising:
   a color information input unit configured to input color information of each pixel of an image;
   a distance information input unit configured to input distance information from a viewpoint for each pixel of the image;
   a reliability derivation unit configured to derive, for each pixel of the image as a pixel of interest, a reliability of the distance information of the pixel of interest based on the color information and the distance information of the pixel of interest and a neighbor pixel of the pixel of interest;
   a parameter derivation unit configured to derive, for each pixel of the image, a parameter concerning a type of a region for the pixel based on the color information and the distance information of the pixel and the reliability of the distance information obtained by said reliability derivation unit; and
   a determination unit configured to determine a foreground region in the image using the derived parameter for each pixel of the image.

2. The apparatus according to claim 1, wherein said reliability derivation unit derives the reliability based on a color information difference between the pixel of interest and the neighbor pixel and a distance information difference between the pixel of interest and the neighbor pixel.

3. The apparatus according to claim 2, wherein said reliability derivation unit derives a relatively high reliability for the pixel of interest when the color information difference between the pixel of interest and the neighbor pixel is smaller than a first predetermined value, and the distance information difference between the pixel of interest and the neighbor pixel is smaller than a second predetermined value, or when the color information difference between the pixel of interest and the neighbor pixel is larger than the first predetermined value, and the distance information difference between the pixel of interest and the neighbor pixel is larger than the second predetermined value.

4. The apparatus according to claim 1, wherein said parameter derivation unit derives the parameter based on at least one of
   a similarity of the color information between the pixel of interest and the neighbor pixel based the color information,
   a background likelihood based on the distance information, which represents a degree of likelihood that the pixel of interest exists in a background, and
   a foreground likelihood based on the distance information, which represents a degree of likelihood that the pixel of interest exists in a foreground.

5. The apparatus according to claim 4, wherein said reliability derivation unit derives the reliability based on the foreground likelihood of the pixel of interest, the background likelihood of the pixel of interest and the distance information of the pixel of interest.

6. The apparatus according to claim 5, wherein said reliability derivation unit derives a relatively high reliability for the pixel of interest when the foreground likelihood of the pixel of interest is higher than the background likelihood, and the distance information of the pixel of interest is smaller than a third predetermined value, or when the foreground likelihood of the pixel of interest is lower than the background likelihood, and the distance information of the pixel of interest is larger than the third predetermined value.

7. The apparatus according to claim 4, wherein said parameter derivation unit modifies the similarity to each pixel of the image as the parameter such that the similarity to a pixel having a relatively high reliability of the distance information becomes relatively high.

8. The apparatus according to claim 4, wherein said parameter derivation unit modifies the foreground likelihood and the background likelihood for each pixel of the image as the parameter such that a difference between the foreground likelihood and the background likelihood of a pixel having a relatively high reliability of the distance information becomes relatively large.

9. The apparatus according to claim 1, wherein said determination unit determines a foreground region in the image by solving a minimization problem of an energy function concerning the derived parameter for each pixel of the image.

10. An image processing apparatus comprising:
    a color information input unit configured to input color information of each pixel of an image of interest that is one of a plurality of images included in a multi-viewpoint image;
    a distance information input unit configured to input distance information from a viewpoint for each pixel of each image included in the multi-viewpoint image;
    a reliability derivation unit configured to derive, for each pixel of the image of interest as a pixel of interest, a reliability of the distance information of the pixel of interest based on the distance information of the pixel of interest in the image of interest and distance information of the pixel corresponding to the pixel of interest in another image included in the multi-viewpoint image;
    a parameter derivation unit configured to derive, for each pixel of the image of interest, a parameter concerning a type of a region for the pixel based on the color information and the distance information of the pixel and the reliability of the distance information obtained by said reliability derivation unit; and
    a determination unit configured to determine a foreground region in the image using the derived parameter for each pixel of the image.

11. The apparatus according to claim 10, wherein said reliability derivation unit derives a relatively high reliability for the pixel of interest when a difference between the distance information of the pixel of interest in the image of interest and the distance information of the pixel corresponding to the pixel of interest in the other image is smaller than a predetermined value.

12. The apparatus according to claim 1, further comprising a compression coding unit configured to compress a foreground region determined by said determination unit at a compression ratio lower than a predetermined compression ratio, and compress a region other than the foreground region at a compression ratio higher than the predetermined compression ratio.

13. An image processing method comprising:
inputting color information of each pixel of the image;
inputting distance information from a viewpoint for each pixel of the image;
deriving, for each pixel of the image as a pixel of interest, a reliability of the distance information of the pixel of interest based on the color information and the distance information of the pixel of interest and a neighbor pixel of the pixel of interest;
deriving, for each pixel of the image, a parameter concerning a type of a region for the pixel based on the color information and the distance information of the pixel and the reliability of the distance information obtained in the deriving the reliability; and
determining a foreground region in the image using the derived parameter for each pixel of the image.

14. An image processing method comprising:
inputting color information of each pixel of an image of interest that is one of a plurality of images included in a multi-viewpoint image;
inputting distance information from a viewpoint for each pixel of each image included in the multi-viewpoint image;
deriving, for each pixel of the image of interest as a pixel of interest, a reliability of the distance information of the pixel of interest based on the distance information of the pixel of interest in the image of interest and distance information of the pixel corresponding to the pixel of interest in another image included in the multi-viewpoint image;
deriving, for each pixel of the image of interest, a parameter concerning a type of a region for the pixel based on the color information and the distance information of the pixel and the reliability of the distance information obtained in the deriving the reliability; and
determining a foreground region in the image using the derived parameter for each pixel of the image.

15. A non-transitory computer readable storage medium storing a program that causes a computer to function as each unit of an image processing apparatus of claim 1.

16. A non-transitory computer readable storage medium storing a program that causes a computer to function as each unit of an image processing apparatus of claim 10.

* * * * *